(12) United States Patent
Aihara et al.

(10) Patent No.: US 11,735,728 B2
(45) Date of Patent: Aug. 22, 2023

(54) CATHODE ACTIVE MATERIAL FOR NON-AQUEOUS ELECTROLYTE SECONDARY BATTERY AND METHOD OF MANUFACTURING CATHODE ACTIVE MATERIAL FOR NON-AQUEOUS ELECTROLYTE SECONDARY BATTERY

(71) Applicant: SUMITOMO METAL MINING CO., LTD., Tokyo (JP)

(72) Inventors: Toshiaki Aihara, Ehime (JP); Hiroyuki Toya, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 322 days.

(21) Appl. No.: 16/764,976

(22) PCT Filed: Nov. 21, 2018

(86) PCT No.: PCT/JP2018/042984
§ 371 (c)(1),
(2) Date: May 18, 2020

(87) PCT Pub. No.: WO2019/103037
PCT Pub. Date: May 31, 2019

(65) Prior Publication Data
US 2020/0403238 A1    Dec. 24, 2020

(30) Foreign Application Priority Data
Nov. 21, 2017  (JP) ................. 2017-224023

(51) Int. Cl.
*H01M 4/525*    (2010.01)
*H01M 4/04*     (2006.01)
(Continued)

(52) U.S. Cl.
CPC ......... *H01M 4/525* (2013.01); *H01M 4/0471* (2013.01); *H01M 4/366* (2013.01);
(Continued)

(58) Field of Classification Search
None
See application file for complete search history.

(56) References Cited

U.S. PATENT DOCUMENTS

| 2016/0336622 A1* | 11/2016 | Zhang ............... H01M 10/20 |
| 2017/0324092 A1  | 11/2017 | Yoshida et al. |
| 2017/0352885 A1  | 12/2017 | Kondo et al. |
| 2018/0047977 A1  | 2/2018  | Furuichi et al. |

FOREIGN PATENT DOCUMENTS

| EP | 3439084    | 2/2019 |
| JP | 2016-167439 | 9/2016 |

(Continued)

OTHER PUBLICATIONS

Parks et al. (KR 10-2016-0050835) (a raw machine translation) (Abstract) (May 11, 2016) (Year: 2016).*

(Continued)

*Primary Examiner* — Carmen V Lyles-Irving
(74) *Attorney, Agent, or Firm* — IPUSA, PLLC

(57) ABSTRACT

A cathode active material for a non-aqueous electrolyte secondary battery including primary particles of a lithium nickel complex oxide represented by a general formula: $Li_zNi_{1-x-y}Co_xM_yO_{2+\alpha}$, and secondary particles in which the primary particles aggregate, wherein a plurality of coated lithium nickel complex oxide particles are formed by disposing a compound containing tungsten and lithium on surfaces of the secondary particles and surfaces of the primary particles positioned inside the secondary particles, and wherein a relative standard deviation of a ratio of a number of atoms of tungsten to a number of atoms of a metallic component other than lithium contained in the coated lithium nickel complex oxide particles is 0.4 or lower.

4 Claims, 2 Drawing Sheets

(51) Int. Cl.
- *H01M 4/36* (2006.01)
- *H01M 4/505* (2010.01)
- *H01M 4/52* (2010.01)
- *H01M 10/0525* (2010.01)
- *H01M 4/02* (2006.01)

(52) U.S. Cl.
CPC ........... *H01M 4/505* (2013.01); *H01M 4/523* (2013.01); *H01M 10/0525* (2013.01); *H01M 2004/028* (2013.01)

(56) References Cited

FOREIGN PATENT DOCUMENTS

| | | |
|---|---|---|
| JP | 2016-183090 | 10/2016 |
| JP | 2016-225275 | 12/2016 |
| JP | 2016-225277 | 12/2016 |
| JP | 2017-063003 | 3/2017 |
| JP | 2017-202971 | 11/2017 |
| KR | 10-2016-0050835 | 5/2016 |
| WO | 2016/103998 | 6/2016 |
| WO | 2016/104305 | 6/2016 |
| WO | 2017/170548 | 10/2017 |

OTHER PUBLICATIONS

Parks et al. (KR 10-2016-0050835) (a raw machine translation) (Detailed Description) (May 11, 2016) (Year: 2016).*

Parks et al. (KR 10-2016-0050835) (a raw machine translation) (Claims) (May 11, 2016) (Year: 2016).*

International Search Report dated Feb. 12, 2019 with respect to PCT/JP2018/042984.

* cited by examiner

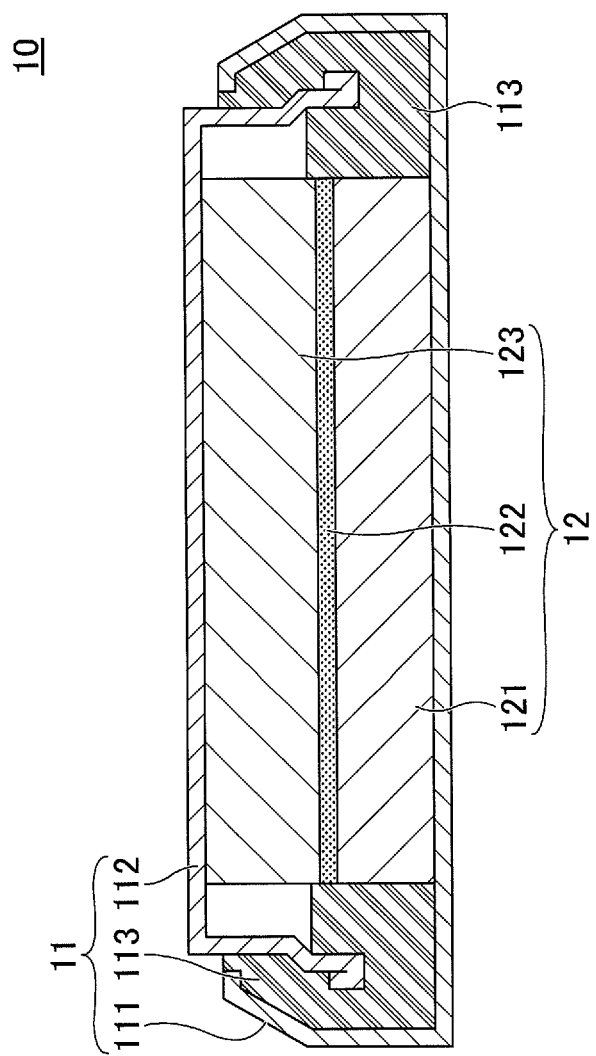

CATHODE ACTIVE MATERIAL FOR NON-AQUEOUS ELECTROLYTE SECONDARY BATTERY AND METHOD OF MANUFACTURING CATHODE ACTIVE MATERIAL FOR NON-AQUEOUS ELECTROLYTE SECONDARY BATTERY

TECHNICAL FIELD

The present invention relates to a cathode active material for non-aqueous electrolyte secondary battery and a method of manufacturing the cathode active material for non-aqueous electrolyte secondary battery.

BACKGROUND ART

In recent years, with the spread of portable electronic apparatuses such as a cellular phone and a notebook PC, there has been an increasing demand for compact, lightweight secondary batteries having high energy density. In addition, the development of high output secondary batteries is strongly desired as a power source for electric vehicles such as hybrid vehicles.

A lithium ion secondary battery, which is a type of non-aqueous electrolyte secondary battery, satisfies these requirements. The lithium ion secondary battery is made of, for example, a cathode, an anode, an electrolyte solution, and the like, wherein the active material used as the materials for the cathode and the anode is made of a material capable of de-inserting and inserting lithium.

At present, research and development of such lithium ion secondary batteries are strongly promoted. From among these, lithium ion secondary batteries that use layered or spinel type lithium metal complex oxide as the cathode material have been developed as batteries with high energy density because they can generate a voltage of 4V class.

Major cathode active materials proposed so far include lithium cobalt complex oxides represented by lithium cobaltate ($LiCoO_2$) as a layered material, lithium nickel complex oxides represented by lithium nickelate ($LiNiO_2$), lithium manganate complex oxides represented by lithium manganate ($LiMn_2O_4$) as a spinel material, and the like.

From among these, the lithium nickel complex oxides are attracting attention as a material with good cycle characteristics and low resistance and high output. In recent years, it has been reviewed to dispose a compound containing tungsten and lithium on surfaces of lithium nickel complex oxide particles for the purpose of increasing the capacity and obtaining a high power output.

For example, Patent Document 1 discloses a cathode active material for non-aqueous electrolyte secondary battery composed of lithium nickel complex oxide particles consisting of primary particles represented by a general formula: $Li_zNi_{1-x-y}Co_xM_yO_2$ ($0.03 \le x \le 0.35$, $0.01 \le y \le 0.35$, $0.95 \le z \le 1.20$, and M is at least one element selected from Mn, V, Mg, Mo, Nb, Ti, and Al) and secondary particles formed by aggregated primary particles. According to the disclosure, a compound including tungsten and lithium on the particle surfaces of secondary particles of the lithium nickel complex oxide particles and the particle surfaces of the primary particles inside the secondary particles is disposed. Further, the lithium amount of a lithium compound other than a compound including tungsten and lithium on the surfaces of lithium nickel complex oxide particles is 0.05% by mass or lower of the total amount of the cathode active material, and the lithium amount of lithium carbonate in the lithium compound is 0.02% by mass or lower of the cathode active material in the disclosed cathode active material for non-aqueous electrolyte secondary battery.

BACKGROUND ART DOCUMENTS

Patent Documents

[Patent Document 1]
Japanese Laid-Open Patent Application No. 2017-63003

SUMMARY OF INVENTION

Problem to be Solved by the Invention

However, in a case where a compound containing tungsten and lithium is disposed on the surfaces of lithium nickel complex oxide particles as the cathode active material for non-aqueous electrolyte secondary battery, the battery characteristics of the secondary battery using the cathode active material for the non-aqueous electrolyte secondary battery may vary and the battery characteristics may become inferior.

The inventors of the present invention have made a review on this reason why the battery characteristics become inferior and found that the compound containing tungsten and lithium disposed on the surface of lithium nickel complex oxide particles may vary between the particles.

Accordingly, an aspect of the present invention is to provide a cathode active material for non-aqueous electrolyte secondary battery having a plurality of coated lithium nickel complex oxide particles each having a coat including a compound containing tungsten and lithium on the surface so as to suppress a variation in tungsten content between the particles.

Means for Solving Problems

In order to solve the above problem, according to one aspect of the present invention, provided are a primary particle having a lithium nickel complex oxide represented by $Li_zNi_{1-x-y}Co_xM_yO_{2+\alpha}$ (provided that $0 < x \le 0.35$, $0 < y \le 0.35$, $0.95 \le z \le 1.20$, $-0.2 \le \alpha \le 0.2$, and M is at least one element selected from Mn, V, Mg, Mo, Nb, Ti, and Al) and a secondary particle in which the primary particle aggregates, a cathode active material for a non-aqueous electrolyte secondary battery including a plurality of coated lithium nickel complex oxide particles, wherein a compound containing tungsten and lithium is disposed on the surface of the secondary particles and the surface of the primary particles inside the secondary particles, a cathode active material for a non-aqueous electrolyte secondary battery wherein the relative standard deviation of the ratio of the number of atoms of tungsten to the number of atoms of a metallic component other than lithium contained in the coated lithium nickel complex oxide particle is 0.4 or less is provided.

Effects of the Invention

According to an aspect of the present invention, a cathode active material for a non-aqueous electrolyte secondary battery may be provided having a plurality of coated lithium nickel-oxide particles having a compound containing tungsten and lithium on the surface, and suppressing variations in tungsten content between the particles.

BRIEF DESCRIPTION OF DRAWINGS

FIG. 1 is an explanatory view of a cross-sectional structure of a coin battery fabricated in Examples and Comparative Examples.

MODE FOR CARRYING OUT THE INVENTION

Figure 2A:
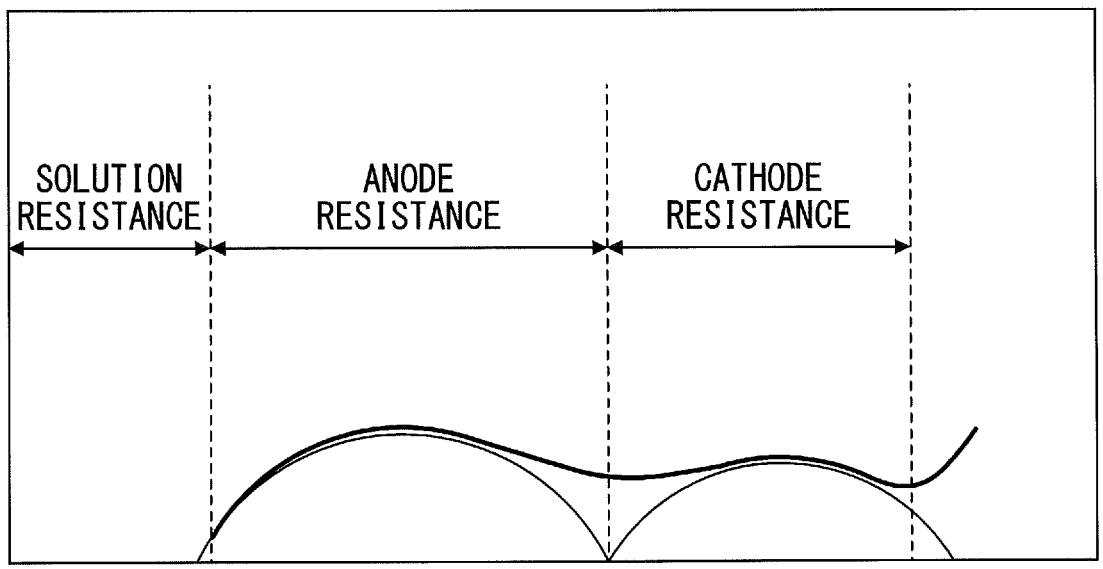
FIG. 2A illustrates an example of measuring impedance evaluation.

While embodiments of the invention will now be described with reference to the accompanying drawings, the invention is not limited to the following embodiments, and various modifications and substitutions can be made to the following embodiments without departing from the scope of the invention.

[Cathode Active Material for Non-Aqueous Electrolyte Secondary Battery]

An example of a cathode active material for a non-aqueous electrolyte secondary battery according to this embodiment will be described below.

The cathode active material for the non-aqueous electrolyte secondary battery according to this embodiment (hereinafter, also referred to as "active cathode material") can include a plurality of lithium nickel complex oxide particles with a coating.

The coated (coating-containing) lithium nickel complex oxide particles include primary particles of lithium nickel complex oxide represented by a general formula: $Li_zNi_{1-x-y}Co_xM_yO2+\alpha$, where $0<x\leq0.35$, $0\leq y\leq0.35$, $0.95\leq z\leq1.20$, and $-0.2<\alpha\leq-0.2$, and one or more types of elements selected from Mn, V, Mg, Mo, Nb, Ti, and Al, and secondary particles in which the primary particles are aggregated, and compounds containing tungsten and lithium are disposed on the surfaces of the secondary particles and the surfaces of the internal primary particles.

The relative standard deviation of the ratio of the number of atoms of tungsten to the number of atoms of a metallic component other than lithium contained in the coated lithium nickel complex oxide particles can be set to be 0.4 or smaller.

The cathode active material of this embodiment can include a plurality of coated lithium nickel complex oxide particles, as described above. Said differently, the cathode active material may be a coated lithium nickel complex oxides powder. The cathode active material according to the present embodiment may include any component in addition to the coated lithium nickel complex oxide powder or may be made from the coated lithium nickel complex oxides powder.

The coated lithium nickel complex oxide particles preferably have primary and secondary particles of the lithium nickel complex oxide represented by a general formula: $Li_zNi_{1-x-y}Co_xM_yO_{2+\alpha}$ (provided that $0<x\leq0.35$, $0\leq y\leq0.35$, $0.95\%\leq z\leq1.20$, and $-0.2\leq\alpha\leq-0.2$, where M is at least one element selected from Mn, V, Mg, Mo, Nb, Ti, and Al). This is because the lithium nickel complex oxide in the coated lithium nickel complex oxide particles has such a composition and thus a high charge and discharge capacity can be obtained.

The coated lithium nickel complex oxide particles can have a compound including tungsten and lithium on the surface of the secondary particles of the lithium nickel complex oxide and on the surface of the primary particles inside the second particles.

As described above, the coated lithium nickel complex oxide in which a compound containing tungsten and lithium is disposed on the surfaces of the secondary particles of the lithium nickel complex oxide and the primary particles inside the secondary particles (hereinafter, collectively referred to as "lithium nickel complex oxide particles"), so as to improve the output characteristics while keeping and improving the charge and discharge capacity. The cycle characteristics can also be improved.

Ordinarily, if the surfaces of lithium nickel complex oxide particles are completely coated with heterogeneous compounds, the properties of having a high capacity of the lithium nickel complex oxide may be degraded because of a significant limitation to migration of lithium ions (intercalation). However, as described above, compounds containing tungsten and lithium have high lithium ion conductivity and are effective in promoting lithium ion migration. Therefore, by disposing this compound on the surfaces of the particles of the lithium nickel complex oxide, a conductive path of lithium at the interface with the electrolytic solution can be formed. Therefore, it is possible to reduce the reaction resistance and improve the output characteristics in the coated lithium nickel complex oxide particles having a compound containing tungsten and lithium disposed on the surface of the lithium nickel complex oxide or the cathode active material including the coated lithium nickel complex oxide particles.

By reducing the reaction resistance of the cathode active material in this way, the loss of voltage in the battery can be suppressed, and the output voltage can be increased. Therefore, the output characteristics can be improved as described above. In addition, the migration of lithium in the cathode is sufficient so as to improve battery capacity. Furthermore, by reducing the reaction resistance, the load on the cathode active material of the anode during charging and discharging can be reduced, and the cycle characteristics can be improved.

The specific composition of the compound including tungsten and lithium is not particularly limited and is sufficient to include tungsten and lithium. It is preferable that tungsten and lithium are in the form of lithium tungstate. Specifically, for example, it is preferable to have one or more forms selected from $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$, $Li_{18}W_5O_{15}$ or any of the hydrates of these compounds.

It is preferable that lithium tungstate be formed so that lithium ion conductivity is further increased to further enhance an effect of reducing the reaction resistance.

The compound containing tungsten and lithium may be disposed of the surfaces of secondary particles of lithium nickel complex oxide or of the inside primary particles as described above. However, the compound need not be completely coated, and would be sufficient if disposed on at least a portion of the surfaces of these particles.

As described above, the compound containing tungsten and lithium is disposed on the surfaces of the secondary particles of lithium nickel complex oxide particles or the inside primary particles of lithium nickel complex oxide to form the coated lithium nickel complex oxide particles. Thus, the reaction resistance of the cathode active material can be suppressed and the output characteristic can be improved.

However, when the cathode active material has the coated lithium nickel complex oxide, the battery characteristics of the secondary battery using the cathode active material may vary and the battery characteristics may be even low. In other words, it may not be possible to obtain sufficient output characteristics.

The inventors of the present invention have made a review on this cause and found that the tungsten content may vary between the coated lithium nickel complex oxide particles.

Therefore, in the cathode active material according to the present embodiment, it is preferable that the relative standard deviation of the ratio of the number of atoms of tungsten to the number of atoms of a metallic component other than lithium contained in the coated lithium nickel complex oxide particles is 0.4 or lower.

The relative standard deviation, also called a coefficient of variation, is the value obtained by dividing the standard deviation by the mean value (divided by the mean value). Therefore, it can be applied even when the mean value is different, i.e. the amount of tungsten added is different.

When calculating the relative standard deviation, the ratio of the number of tungsten atoms to the number of atoms of the metallic component other than lithium is measured and calculated for multiple coated lithium nickel complex oxide particles of the cathode active material according to this embodiment.

The ratio of the number of atoms of tungsten to the number of atoms of the metallic component other than lithium contained in the coated lithium nickel complex oxide particles can be calculated, for example, by the following equation (1).

$$N_W/(N_{Ni}+N_{Co}+N_M+N_W) \quad (1)$$

Here, $N_W$ in the above equation (1) means the number of atoms of tungsten contained in the coated lithium nickel complex oxide particles. Here, $N_{Ni}$, $N_{CO}$, and $N_M$ mean the number of nickel atoms, the number of cobalt atoms, and the number of M atoms contained in the coated lithium nickel complex oxide particles, respectively. As described above, M is at least one element selected from Mn, V, Mg, Mo, Nb, Ti, and Al.

The method of measuring the number of atoms of tungsten or the like in the above-described equation (1) for the coated lithium nickel complex oxide particles is not particularly limited. However, for example, EDS (Energy Dispersive X-ray Spectrometry) or the like may be used. In addition, although the number of particles of the coated lithium nickel complex oxide to be measured is not particularly limited, for example, it is preferable that the number be not less than 5 and not more than 100, and it is more preferable that the number be not less than 10 and not more than 20.

From the obtained measured values, the mean value and the standard deviation of the ratio of the number of tungsten atoms to the number of atoms of a metallic component other than lithium can be calculated, and the relative standard deviation can be obtained from the mean value and the standard deviation.

By setting the relative standard deviation of the ratio of the number of atoms of tungsten to the number of atoms of a metallic component other than lithium contained in the coated lithium nickel complex oxide particles to 0.4 or less, the battery characteristics of the secondary battery using the cathode active material containing the coated lithium nickel complex oxide particles can be stably enhanced. This means that the coated lithium nickel complex oxide particles contained in the cathode active material contain approximately the same amounts of the compounds of tungsten and lithium. That means that the lithium nickel complex oxide particles are coated with tungsten and lithium. This is probably because the characteristics of the coated lithium nickel complex oxide particles contained in the cathode active material become uniform.

More preferably, the relative standard deviation is 0.35 or less.

The relative standard deviation can be 0 or more.

The amount of tungsten contained in the coated lithium nickel complex oxide particles of the cathode active material according to the present embodiment is not particularly limited. However, it is preferable that the ratio of the number of atoms of tungsten to the number of atoms of the metallic component other than lithium contained in the coated lithium nickel complex oxide particles is 0.01% or more and 3.0% or less, and it is more preferable that the ratio of the number of atoms of tungsten is 0.05% or more and 2.0% or less. Particularly, it is preferable that the ratio be not less than 0.05% and not more than 1.0%.

The ratio (in percentage terms) of the number of tungsten atoms to the number of atoms of non-lithium metallic components contained in the coated lithium nickel complex oxide particles can be calculated by the following equation (2).

$$N_W/(N_{Ni}+N_{Co}+N_M+N_W) \times 100 \quad (2)$$

$N_W$ in the above equation (2) means the number of atoms of tungsten contained in the coated lithium nickel complex oxide particles. $N_{Ni}$, $N_{CO}$, and $N_M$ mean the number of nickel atoms, the number of cobalt atoms, and the number of M atoms contained in the coated lithium nickel complex oxide particles, respectively. As described above, M is at least one element selected from Mn, V, Mg, Mo, Nb, Ti, and Al.

By setting the number of atoms of tungsten to 0.01% or more of the number of atoms of the metallic component other than lithium contained in the coated lithium nickel complex oxide particles, a compound containing tungsten and lithium can sufficiently cover the surfaces of the secondary particles and the primary particles of lithium nickel complex oxide. Therefore, it is preferable because the output characteristics can be particularly increased.

In addition, it is preferable that the ratio of the number of atoms of tungsten to the number of atoms of the metallic component other than lithium contained in the coated lithium nickel complex oxide particles is 3.0% or less, so that it is possible to prevent the degree of coating from being excessively high by compounds containing tungsten and lithium.

[Method for Manufacturing Active Cathode Materials for Non-Aqueous Electrolyte Secondary Battery]

Next, a configuration example of a method of manufacturing the cathode active material for non-aqueous electrolyte secondary battery according to this embodiment will be described.

The above active cathode material can be manufactured by the method of manufacturing the active cathode material for the non-aqueous electrolyte secondary battery according to the present embodiment. For this reason, some of the matters already explained will be omitted.

A method of manufacturing an active cathode material for the non-aqueous electrolyte secondary battery according to this embodiment (hereinafter, also referred to as a "method of manufacturing cathode active material for non-aqueous electrolyte secondary battery") may include the following processes.

Mixing processes in which lithium nickel complex oxide particles, tungsten trioxide, and water are mixed to yield a tungsten mixture. A heat treatment process of heat treating a tungsten mixture. Incidentally, lithium nickel complex oxide particles can have primary particles represented by the general formula: $Li_zNi_{1-x-y}Co_xM_yO_{2+\alpha}$ (where $0<x\le0.35$, $0\le y\le0.35$, $0.95\le z\le1.20$, and $-0.2\le\alpha\le0.2$, and M=one or more elements selected from Mn, V, Mg, Mo, Nb, Ti, and Al), and secondary particles in which the primary particles are aggregated.

It is preferable that tungsten trioxide has an $I_{WO2.90}/I_{WO3.00}$, which is the ratio of the peak intensity $I_{WO20.90}$ of the (200) plane of $WO_{2.90}$ to the peak intensity $I_{WO3.00}$ of the (200) plane of $WO_{3.00}$, which is 0.15 or less in the XRD pattern.

Each process is described below.

[Mixing Process]

In the mixing process, lithium nickel complex oxide particles, tungsten trioxide, and water can be mixed to obtain a mixture of tungsten trioxide and moisture containing lithium nickel complex oxide particles.

The tungsten mixture is heat-treated in a heat treatment process described below to cause a reaction of the tungsten trioxide with lithium compounds such as excess lithium present on the surfaces of the secondary particles of lithium nickel complex oxide and the surfaces of the inside primary particles. Thus, a compound containing tungsten and lithium may be disposed on the surface of the secondary particles of lithium nickel complex oxide and the surfaces of the inside primary particles.

Here, it is preferable that the moisture percentage in the tungsten mixture, that is, the moisture content be 3.5% by mass or higher and 7.5% by mass or lower. By adjusting the moisture percentage to be within the above-described range, a sufficient amount of moisture is caused to be contained in the tungsten mixture during the heat treatment process to sufficiently disperse a compound containing tungsten and lithium on the surfaces of the primary particles, and an excessive dissolution of lithium from the lithium nickel complex oxide particles can be suppressed. This is because by making the moisture percentage of the tungsten mixture to be 3.5% by mass or higher, the compounds containing tungsten and lithium can be uniformly dispersed on the surface of the primary particles, such as lithium nickel complex oxides particles, in the heat treatment process. Further, it is preferable that the moisture percentage in the tungsten mixture be 7.5% by mass or lower because the excessive dissolution of lithium can be prevented from the lithium nickel complex oxide.

According to the review by the inventors of the present invention, it is preferable that the mixing process of tungsten trioxide has an $I_{WO2.90}/I_{WO3.00}$, which is a ratio of the peak intensity $I_{WO2.90}$ of the (200) plane of $WO_{2.90}$ to the peak intensity $I_{WO3.00}$ of the (200) plane of $W_{3.00}$, be 0.15 or lower in the XRD pattern.

Even if it is sold as high purity tungsten trioxide, which has not been reviewed so far, it may contain $WO_{2.90}$, which is partially oxygen deficient.

The inventors of the present invention have also reviewed that $WO_{2.90}$ is less reactive with lithium compounds and more likely to remain as an unreacted product.

On the other hand, in the case of tungsten trioxide having an $I_{WO2.90}/I_{WO3.00}$ of 0.15 or lower as described above, the ratio of $WO_{2.90}$ in tungsten trioxide is suppressed, so that a compound containing tungsten and lithium can be uniformly disposed on the surfaces of the secondary particles of lithium nickel complex oxide and the surfaces of the inside primary particles. Therefore, it is preferable that the relative standard deviation of the ratio of the number of atoms of tungsten to the number of atoms of the metallic component other than lithium contained in the coated lithium nickel complex oxide particles obtained after firing be particularly low.

The content of $WO_{2.90}$ in tungsten trioxide can be evaluated by $I_{WO2.90}/I_{WO3.00}$, which is the ratio of the peak intensity $I_{WO20.90}$ on the (200) plane of $WO_{2.90}$ to the peak intensity $I_{WO3.00}$ on the (200) plane of $WO_{3.00}$ in the XRD pattern obtained by powder X-ray diffraction measurement as described above.

Then, according to the review by the inventors of the present invention, by setting the $I_{WO2.90}/I_{WO3.00}$ to 0.15 or less, $WO_{2.90}$ is sufficiently inhibited in this tungsten trioxide.

When the content of $I_{WO2.90}/I_{WO3.00}$ exceeds 0.15, it is preferable to provide an oxidizing process that the tungsten trioxide be oxidized under a flow of oxygen while stirring the tungsten trioxide, etc. and a mixing process as tungsten trioxide with a suppressed content of $WO_{2.90}$.

The $I_{WO2.90}/I_{WO3.00}$ of tungsten trioxide is more preferably 0.14 or lower, more preferably 0.12 or lower, and particularly preferably 0.10 or lower.

The lower limit of $I_{WO2.90}/I_{WO3.00}$ is not particularly limited, but may be, for example, equal to or higher than 0.

In addition, it is preferable that the cumulative particle 10% diameter of tungsten trioxide subjected to the mixing process be not less than 10 μm, the cumulative particle 50% diameter of tungsten trioxide subjected to the mixing process be not less than 30 μm and cumulative particle 90% diameter of tungsten trioxide subjected to the mixing process be not more than 55 μm, and not more than 100 μm, respectively.

If the content of fine tungsten trioxide particles is too high, the particles will be aggregated and become difficult to disperse. Further, when the coarse particle content ratio of tungsten trioxide is too high, reaction with lithium compounds is difficult to proceed in the heat treatment process, and a portion of tungsten trioxide may remain as unreacted material.

Meanwhile, when the cumulative 10% particle diameter, the cumulative 50% particle diameter, and the cumulative 90% particle diameter of tungsten trioxide are within the above-described range, it becomes easy to disperse and is possible to sufficiently increase the reactivity with the lithium compound in the heat treatment process. Thus, after the heat treatment process, compounds containing tungsten and lithium can be particularly uniformly disposed on the surfaces of the secondary particles and the inside primary particles of lithium nickel complex oxides. As a result, this composition is preferable because the relative standard deviation of the ratio of the number of atoms of tungsten to the number of atoms of a metallic component other than lithium contained in the coated lithium nickel complex oxide particles be particularly low.

The upper limit of the cumulative 10% particle diameter is not particularly limited, but may be, for example, 25 μm or less. In addition, the lower limit of the cumulative 90% particle diameter may be 60 μm or more, although it is not particularly limited.

The cumulative 10% particle diameter (D10) means a particle diameter at a cumulative volume of 10% in the particle size distribution determined by the laser diffraction/scattering method.

The cumulative 50% particle diameter (D50) refers to the particle diameter at a cumulative volume of 50% in the particle size distribution determined by the laser diffraction/scattering method.

The cumulative 90% particle diameter (D90) refers to the particle diameter in the cumulative 90% of the particle size distribution obtained by the laser diffraction/scattering method.

In addition, it is preferable that the specific surface area of tungsten trioxide subjected to the mixing process is 0.5 m$^2$/g or greater and 7.0 m$^2$/g and smaller, and is 4.0 m$^2$/g or greater and 6.5 m$^2$/g or smaller.

This allows sufficient reactivity with the lithium compound in the heat treatment process when the specific surface area of tungsten trioxide is 0.5 m$^2$/g or greater. Thus, after the heat treatment process, the compounds containing tungsten and lithium can be particularly uniformly disposed on the surfaces of the secondary particles and the inside primary particles. As a result, it is preferable because the relative standard deviation of the ratio of the number of atoms of tungsten to the number of atoms of the metallic component other than lithium contained in the coated lithium nickel complex oxide particles can be made particularly low.

Further, it is preferable to make the specific surface area of tungsten trioxide 7.0 m$^2$/g or less because it is considered that a part of the tungsten trioxide can be prevented from changing to WO$_{2.90}$.

The particle size distribution of tungsten trioxide and the method of adjusting the specific surface area are not particularly limited. However, it is possible to adjust and control tungsten trioxide by, performing a process of crushing to fracture or sieving, for example.

A method of manufacturing lithium nickel complex oxide particles subjected to the mixing process is not particularly limited.

For example, the lithium nickel complex oxide particles can be manufactured by firing a raw material mixture of a lithium compound, such as lithium hydroxide or lithium carbonate, and a nickel complex oxide.

The nickel complex oxides is not particularly limited, but preferably has a composition corresponding to lithium nickel complex oxides manufactured from a raw material mixture.

Examples of nickel complex oxide are specifically nickel cobalt complex oxide represented by the general formula: Ni$_{1-x-y}$Co$_x$M$_y$O$_{1+\beta}$ (where 0<x≤0.35, 0<y≤0.35, −0.2≤β≤0.2, and M is at least one element selected from Mn, V, Mg, Mo, Nb, Ti, and Al).

In addition, although the temperature of firing the raw material mixture is not particularly limited, for example, it is preferable to be 600° C. or higher and 950° C. or lower and more preferable to be 700° C. or higher and 900° C. or lower. In addition, although the firing atmosphere is not particularly limited, it is preferable that the atmosphere be an oxidizing gas, and it is more preferable that the atmosphere be under a flow of the oxidizing gas. The oxidizing gas is preferably a gas containing oxygen of 18 vol % or higher and 100 vol % or lower. For example, air (atmosphere), a mixture gas of oxygen and an inert gas, oxygen, and the like can be used.

Immediately after the raw material mixture is fired, excess lithium or the like which has not reacted may be adhered to the surface of lithium nickel complex oxide particles, and lithium nickel complex oxide particles are water-washed before being subjected to this mixing process. The water-washing process is performed such that the obtained lithium nickel complex oxide particles are added to pure water, makes slurry, provides filtration, etc. to separate the liquid.

In making the slurry, the concentration (amount) of lithium nickel complex oxide particles relative to the water contained in the slurry is not particularly limited. However, it is preferable to mix the particles so as to be 750 g/L or higher and 2000 g/L or lower, and it is more preferable to mix the particles so as to be 1000 g/L or lower and 1500 g/L or higher.

This is because, by setting the concentration of lithium nickel complex oxide particles to the water contained in the slurry to be 750 g/L or higher an excessive amount of residual components, for example, excess lithium, etc., adhered to the surfaces of lithium nickel complex oxide particles can be properly caused to remain and, after water-washing the lithium compounds, the excess lithium remaining on the surfaces of the secondary particles and the inside primary particles of the lithium nickel complex oxide can react with tungsten trioxide. In addition, when the concentration of lithium nickel complex oxide particles to the water contained in the slurry is set to 2000 g/L or less, the high viscosity of the slurry is suppressed, and stirring is easily performed.

Although the water used in the water washing process is not particularly limited, it is preferable that the electrical conductivity of the water be 10 μS/cm or lower, and it is more preferable that the water be 1 μS/cm or lower. In addition, it is preferable to select the temperature of water so that the temperature of the slurry is 10° C. or higher and 40° C. or lower.

The water-washing time is not particularly limited. However, it is preferable that the washing time be not less than five minutes but not more than one hour, for example, from the viewpoint of increasing the productivity while remaining an adequate amount of excessive component adhered to the surfaces of lithium nickel complex oxide particles. It is preferable that the prepared slurry be stirred during the water-washing.

When filtration is performed, a filter press or the like may be used. When filtration is performed, by adjusting the amount of water contained in the filtrated material, the water contained in the filtrate can be used as water of the raw material in the mixing process, for example.

The ratio of mixing the lithium nickel complex oxide particles and the tungsten trioxide in the mixing process is not particularly limited. However, in the cathode active material obtained after the heat treatment process, it is preferable that the ratio of the number of atoms of tungsten to the number of atoms of the metallic component other than lithium contained in the coated lithium nickel complex oxide particles is mixed so as to be within the desired range.

Therefore, for example, it is preferable to mix the number of atoms of tungsten contained in the tungsten mixture so that it is not less than 0.01% or higher and 3.0% or lower of the total number of atoms of the metallic components other than lithium contained in the tungsten mixture. In particular, it is more preferable that the mixing be such that the ratio is 0.05% or higher and 2.0% or lower, and it is more preferable that the ratio is 0.05% or higher and 1.0% or lower.

In addition, the temperature when mixing and kneading lithium nickel complex oxide particles, tungsten trioxide, and water in the mixing process is not particularly limited. Specifically, for example, it is preferable that the temperature be 10° C. or higher and 50° C. or lower, and it is more preferable that the temperature be 20° C. or higher and 50° C. or lower.

This is because the temperature at the time of mixing is less than 50° C. so that tungsten trioxide and water can be uniformly dispersed in lithium nickel complex oxide particles while suppressing the decrease in water content in the tungsten mixture.

On the other hand, since it is possible to elute the excess lithium compound at a time of mixing at a temperature of 10° C. or higher, and at the same time, it is possible to more evenly disperse tungsten on the surfaces of the primary particles of the lithium nickel complex oxide. Therefore, it is preferable.

In the mixing process, a means for mixing lithium nickel complex oxide particles, tungsten trioxide, and water is not particularly limited, and for example, an ordinary mixer may be used.

For example, one or more types selected from a shaker mixer, a LODIGE mixer, a Julia mixer, a V blender, or the like can be used as the mixer, and it is preferable to mix the particles sufficiently so that shape of the lithium nickel complex oxide particles are not broken.

[Heat Treatment Process]

In the heat treatment process, the tungsten mixture can be heat-treated.

The heat treatment conditions in the heat treatment process are not particularly limited, and preferably the conditions are selected so that the compound containing tungsten and lithium can be formed and disposed on the surfaces of the lithium nickel complex oxide particles.

The heat treatment process may include, for example, a two-step heat treatment process.

A first heat treatment process can be performed by reacting a lithium compound present on the surfaces of the primary particles of lithium nickel complex oxide particles with tungsten trioxide to produce a compound containing tungsten and lithium, and dissolving and dispersing the compound containing tungsten and lithium in water. In addition, there may be a second heat treatment process in which the compounds containing tungsten and lithium are formed on the surface of the secondary particles and the inside primary particles of the lithium nickel complex oxide particles by heat treatment at a temperature higher than the heat treatment temperature of the first heat treatment process.

In the first heat treatment process, the tungsten mixture can be heated to react not only the lithium eluted into the mixture but also the lithium compounds remaining on the surfaces of the primary particles of the lithium nickel complex oxide with tungsten trioxide. The compound can then be formed, including tungsten and lithium.

The production of compounds containing tungsten and lithium can greatly reduce the excess lithium in the obtained cathode active material and improve battery properties.

Compounds containing tungsten and lithium formed by the first heat treatment process can be dissolved in moisture in the tungsten mixture and dispersed on the surfaces of the secondary particles and the inside primary particles of the lithium nickel complex oxide.

As described above, in the first heat treatment process, since the lithium compound is reacted tungsten trioxide to disperse the compound containing tungsten and lithium, it is preferable that water remains until the reaction proceed sufficiently and the compound containing tungsten and lithium is dispersed.

Therefore, it is preferable that the heat treatment temperature in the first heat treatment process be not less than 60° C. or higher and 80° C. or lower.

This is because the reaction between the lithium compound and tungsten trioxide is sufficiently advanced by setting the heat treatment temperature of the first heat treatment process to 60° C. or higher, and a compound containing tungsten and lithium is sufficiently formed.

Further, when the heat treatment temperature of the first heat treatment process is set to 80° C. or lower, the evaporation of water is suppressed, and dispersion of a compound containing tungsten and lithium can be promoted.

The heat treatment time of the first heat treatment process is not particularly limited, but is preferably 0.5 hours or longer and 2 hours or shorter, for example.

The second heat treatment process is capable of sufficiently evaporating the moisture in the tungsten mixture by heat treatment at a temperature higher than the heat treatment temperature of the first heat treatment process to form the compound containing tungsten and lithium on the surfaces of the secondary particles and the internal primary particles of the lithium nickel complex oxide.

The heat treatment temperature of the second heat treatment process is not particularly limited, but for example, it is preferable that the heat treatment temperature be 100° C. or higher and 200° C. or lower.

The heat treatment temperature is preferably 100° C. or higher because moisture in the tungsten mixture can be sufficiently evaporated, and the compound containing tungsten and lithium can be sufficiently formed on the surfaces of the secondary particles of the lithium nickel complex oxide and the internal primary particles of the lithium nickel complex oxide.

Further, the heat treatment temperature is preferably 200° C. or lower because it is possible to more reliably prevent each lithium nickel complex oxide particles from forming a necking.

Although a heat treatment time of the second heat treatment process is not particularly limited, it is preferably 5 hours or longer and 15 hours or shorter in order to sufficiently evaporate the moisture to form the compound containing tungsten and lithium.

The atmosphere in the heat treatment process is preferably a decarboxylated air, an inert gas, or a vacuum atmosphere in order to avoid reaction of the moisture or carbonic acid in the atmosphere with lithium on the surfaces of the lithium-nickel composite oxide particles.

[Non-Aqueous Electrolyte Secondary Battery]

Next, a structure example of a non-aqueous electrolyte secondary battery according to this embodiment will be described.

The non-aqueous electrolyte secondary battery according to this embodiment can have a cathode using the above active cathode active material as a cathode material.

First, the structure example of the non-aqueous electrolyte secondary battery according to this embodiment will be described.

The non-aqueous electrolyte secondary battery according to this embodiment can have a structure substantially similar to that of an ordinary non-aqueous electrolyte secondary battery, except that the cathode material uses the above active cathode material.

Specifically, the non-aqueous electrolyte secondary battery according to this embodiment can have a structure including, for example, a case, a cathode, an anode, an electrolyte solution, and a separator included within the case.

More specifically, the cathode and the anode can be laminated through a separator to form an electrode body, and the resulting electrode body can be impregnated with an electrolyte solution. It is possible to have a structure, in which a cathode current collector and a cathode terminal coupled to the outside and an anode collector and an anode terminal coupled to the outside are respectively connected using lead wires for current collection and the like, and the cathode and the anode are hermetically sealed in a case.

The structure of the non-aqueous electrolyte secondary battery according to the present embodiment is not limited to the above-described examples, and various shapes, such as cylindrical and laminated shapes, can be employed.

An example of the structure of each part will be described below.

(Cathode)

First, the cathode is described.

The cathode is a sheet-like part. For example, the surface of the current collector made of aluminum foil is coated by the cathode mixture material paste containing the lithium nickel complex oxide described above and the coating cathode mixture material paste is dried to form the cathode. The cathode is appropriately processed in accordance with the battery to be used. For example, a cutting process may be performed in which a suitable size is formed depending on the desired battery, or a pressurizing compression process may be performed by a roll press or the like in order to increase the electrode density.

The above-described cathode mixture material paste can be formed by adding a solvent to the cathode mixture material and kneading it. The cathode mixture material can be formed by mixing the above lithium nickel complex oxide in powder form, a conductive material, and a binding agent.

The conductive material is added to provide appropriate conductivity to the electrodes. Although the material of the conductive material is not specifically limited, graphite such as natural graphite, artificial graphite and expanded graphite, or carbon black-based material such as acetylene black and Ketchen Black ("Ketchen Black" is a registered trademark) may be used.

The binding agent functions to anchor the lithium nickel complex oxide, which is the cathode active material. The binding agent used for such a cathode mixture material is not specifically limited. However, one or more kinds selected from, for example, polyvinylidene fluoride (PVDF), polytetrafluoroethylene (PTFE), fluorine rubber, ethylene propylene diene rubber, styrene butadiene, cellulosic resin, polyacrylic acid, or the like can be used.

In addition, activated carbon or the like may be added to the cathode mixture material. The electric double layer capacity of the cathode can be increased by adding activated carbon or the like to the cathode mixture material.

The solvent acts to dissolve the binding agent and disperses the lithium nickel complex oxide, conductive material, activated carbon, and the like in the binding agent. The solvent is not specifically limited, but an organic solvent such as, for example, N-methyl-2-pyrrolidone may be used.

In addition, the mixing ratio of each substance in the cathode mixture material paste is not specifically limited, and may be the same as in the case of, for example, the cathode of an ordinary non-aqueous electrolyte secondary battery. For example, when the solid content of the cathode mixture material without the solvent is 100 parts by mass, the content of the lithium nickel complex oxide can be 60 parts by mass or higher and 95 parts by mass or lower, the content of the conductive material can be 1 part by mass or higher and 20 parts by mass or lower, and the content of the binding agent can be 1 part by mass or higher and 20 parts by mass or lower.

The method of manufacturing the cathode is not limited to the above method. For example, the cathode mixture material or the cathode paste may be subjected to press molding and then dried under a vacuum atmosphere.

(Anode)

The anode is a sheet-like part. For example, metallic lithium, lithium alloy, or the like may be used for the anode. The anode can also be formed by applying and drying the anode mixture material paste on the surface of a metal foil current collector, such as copper.

The anode is formed by substantially the same method as the above-described cathode though the components constituting the anode mixture material paste, the composition thereof, the material of the current collector, etc. are different, and various processing is performed as necessary as well as the cathode.

The anode paste can be made into a paste by adding a suitable solvent to anode mixture material which is a mixture of the anode active material and the binding agent.

As the anode active material, for example, a material containing lithium, such as metallic lithium or a lithium alloy, or inserting material capable of inserting and de-inserting lithium ions can be employed.

Although the inserting material is not specifically limited, one or more kinds selected from, for example, an organic compound firing substance such as natural graphite, artificial graphite, and phenolic resins, and carbon material powders such as coke can be used.

When such inserting material is adopted as the anode active material, a fluorine-containing resin such as PVDF may be used as the binding agent, and as a solvent for dispersing the anode active material in the binding agent, an organic solvent such as N-methyl-2-pyrrolidone may be used.

(Separator)

The separator is arranged between the cathode and the anode, and it separates the cathode and the anode, and functions to keep the electrolyte solution.

As the material of the separator, for example, a thin film, such as polyethylene or polypropylene, having a large number of fine pores may be used. However, if the separator has the above-described function, the separator is not specifically limited.

(Electrolyte Solution)

The electrolyte solution is a solution of lithium salt as a supporting salt in the organic solvent.

The organic solvent may be used as one kind independently of or a mixture of two or more kinds of a cyclic carbonate such as ethylene carbonate, propylene carbonate, butylene carbonate, or trifluoropropylene carbonate; a chain carbonate such as diethylcarbonate, dimethylcarbonate, ethyl methyl carbonate, or dipropylcarbonate; an ether compound such as tetrahydrofuran, 2-methyl tetrahydrofuran, or dimethoxyethane; a sulfur compound such as ethyl methyl sulfone or butane sultone; or a phosphorus compound such as triethyl phosphate or trioctyl phosphate.

The supporting salt may be $LiPF_6$, $LiBF_4$, $LiClO_4$, $LiAsF_6$, $LiN(CF_3SO_2)_2$, or a composite salt thereof.

The electrolyte solution may include a radical scavenger, a surfactant, a flame retardant, or the like to improve the battery property.

Heretofore, the non-aqueous electrolyte secondary battery according to this embodiment has been described as an example of a mode in which an electrolyte solution (a non-aqueous electrolyte solution) is used as the electrolyte. However, the non-aqueous electrolyte secondary battery according to this embodiment is not limited to such form. For example, a solid electrolyte may be used as the electrolyte (non-aqueous electrolyte). The solid electrolyte has the property to withstand high voltages. Examples of the solid electrolyte include inorganic solid electrolyte and organic solid electrolyte.

The inorganic solid electrolyte is an oxide-based solid electrolyte and a sulfide-based solid electrolyte.

The oxide-based solid electrolyte is not specifically limited. For example, a material containing oxygen (O) and having a lithium ion conductivity and an electron insulating property may be preferably used. An example of the oxide-based solid electrolyte may be at least one kind selected from lithium phosphate ($Li_3PO_4$), $Li_3PO_4NX$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ (0≤X≤1), $Li_{1+X}Al_XGe_{2-X}(PO_4)_3$ (0≤X≤1), $LiTi_2(PO_4)_3$, $Li_{3X}La_{2/3-X}TiO_3$ (0≤X≤⅔), $Li_5La_3Ta_2O_{12}$, $Li_7La_3Zr_2O_{12}$, $Li_6Ba_2Ta_2O_{12}$, $Li_{3.6}Si_{0.6}P_{0.4}O_4$, and so on.

The sulfide-based solid electrolyte is not specifically limited. For example, a material containing sulfur (S) and having a lithium ion conductivity and an electron insulating property may be preferably used. As the sulfide-based solid electrolyte, for example, at least one type selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, or the like can be used.

The inorganic solid electrolyte other than the above may be used. For example, $Li_3N$, $LiI$, $Li_3N$—$LiI$—$LiOH$, or the like may be used.

The organic solid electrolyte is not specifically limited as long as the organic solid electrolyte is a polymer compound exhibiting an ionic conductivity. For example, polyethylene oxide, polypropylene oxide, a copolymer thereof, and the like may be used. The organic solid electrolyte may also contain supporting salt (lithium salt).

As described above, when providing the non-aqueous electrolyte secondary battery using a solid electrolyte as the electrolyte, said differently, a total solid battery is used, the structure other than the cathode active material can be changed from the above structure as necessary.

The non-aqueous electrolyte secondary battery according to this embodiment has a cathode that uses lithium nickel complex oxide as the cathode material. Therefore, it is possible to provide a non-aqueous electrolyte secondary battery having the low reaction resistance at the cathode being an excellent battery property.

EXAMPLE

Hereinafter, the invention will be described in more detail with reference to examples. However, the invention is not limited to the following examples.

Example 1

Tungsten trioxide as raw material was evaluated. In addition, the cathode active material was manufactured using tungsten trioxide according to the following procedure and evaluated.

Here, first described is an evaluation method.
(XRD Peak Intensity Ratio)

The XRD pattern of tungsten trioxide used as the raw material was measured using a powder X-ray diffractometer (Model: Ultima IV, manufactured by Rigaku Corporation). The measurement conditions were as follows: source: CuKα ray, tube voltage: 40 kV, tube current: 40 mA, sampling width: 0.02 degrees, scan speed: 2.0 degrees/min, diverging slit: 1 degree, scattering slit: 1 degree, and receiving slit: 0.3 mm.

From the obtained XRD pattern, the peak intensity of the (200) plane of $WO_{2.90}$ and the peak intensity of the (200) plane of $WO_{3.00}$ were calculated, and the $I_{WO2.90}/I_{WO3.00}$ was calculated as the XRD peak intensity ratio.
(Cumulative 10% Particle Diameter, Cumulative 50% Particle Diameter, Cumulative 90% Particle Diameter)

The particle size distribution of tungsten trioxide used as the raw material was measured using a laser diffraction/scattering particle size analyzer (Model: HRA9320 X-100, manufactured by Nikkiso Co., Ltd.). Then, the cumulative 10% particle diameter, cumulative 50% particle diameter, and cumulative 90% particle diameter were calculated from the obtained particle size distribution.
(Specific Surface Area)

The specific surface area of tungsten trioxide used as the raw material was evaluated by a full automatic BET surface area analyzer (Model: Macsorb HM model-1220, manufactured by Mountech Co., Ltd.).
(Relative Standard Deviation of the Ratio of the Number of Atoms in Tungsten to the Number of Atoms in the Metallic Component Other than Lithium Contained in the Coated Lithium Nickel Complex Oxide Particles)

The obtained cathode active material was fixed to a carbon tape and observed using a field emission scanning electron microscope (Model: JSM-7001F, manufactured by Nippon Electronics Co., Ltd.) without conducting surface conductive treatment. The observation conditions were as follows: accelerating voltage, 5 kV; WD=10 mm; detector=reflected electron.

Then, the atomic concentration of Ni, Co, Al, and W was measured by elemental analysis using EDS for 10 randomly selected lithium nickel complex oxide particles having a particle diameter of 10 μm or more.

Then, using the obtained atomic concentration, the ratio of the number of atoms of tungsten to the number of atoms of a metallic component other than lithium contained in the coated lithium nickel complex oxide particles was calculated by the following equation (1).

$$N_W/(N_{Ni}+N_{Co}+N_M+N_W) \quad (1)$$

$N_W$ in the above equation (1) means the number of atoms of tungsten contained in the coated lithium nickel complex oxide particles. $N_{Ni}$, $N_{Co}$, and $N_M$ mean the number of nickel atoms, the number of cobalt atoms, and the number of aluminum atoms that are an atom M, respectively, contained in the coated lithium nickel complex oxide particles.

After calculating the mean value and the standard deviation from the calculated value, the relative standard deviation was calculated by dividing the standard deviation by the mean value.
(Ratio of the Number of Tungsten Atoms to the Number of Atoms of the Non-Lithium Metallic Components Containing the Coated Lithium Nickel Complex Oxide Particles)

The resulting cathode active material was immobilized on carbon tape and observed by field emission scanning electron microscopy without surface conductive treatment. The observation conditions were as follows: acceleration voltage, 5 kV; WD=10 mm; detector=reflected electron.

Then, the atomic concentration of Ni, Co, Al, and W was measured by elemental analysis using EDS of an arbitrarily selected lithium nickel complex oxide particles having a particle diameter of 10 μm or more.

Then, using the obtained atomic concentration, the ratio of the number of atoms of tungsten to the number of atoms of the metallic component other than lithium contained in the coated lithium nickel complex oxide particles was calculated by the following equation (2).

$$N_W/(N_{Ni}+N_{Co}+N_M+N_W)\times 100 \quad (2)$$

$N_W$ in the above equation (2) means the number of atoms of tungsten contained in the coated lithium nickel complex oxide particles. $N_{Ni}$, $N_{CO}$, and $N_M$ mean the number of nickel atoms, the number of cobalt atoms, and the number of Al atoms, which are the atoms M, respectively, contained in the coated lithium nickel-nickel complex oxide particles.

(Initial Discharge Capacity, Reaction Resistance Ratio)

The performance (initial discharge capacity and reaction resistance) of the obtained secondary battery having the cathode used as the obtained cathode active material was evaluated. First, a coin battery 10 of a type 2032 illustrated in FIG. 1 was fabricated in the following manner, and the initial discharge capacity and reaction resistance ratio were evaluated.

The coin battery 10 of the type 2032 includes a case 11 and an electrode 12 accommodated in the case 11.

The case 11 of the coin battery 10 of the type 2032 includes a cathode can 111 which is hollowed out and has an open end, and an anode can 112 which is to be disposed in an opening of the cathode can 111. When the anode can 112 is disposed in the opening of the cathode can 111, a space for accommodating the electrodes 12 is formed between the anode can 112 and the cathode can 111.

The electrode 12 is made of a cathode 121, a separator 122, and an anode 123 and is stacked in this order and is accommodated in the case 11 such that the cathode 121 contacts the inner surface of the cathode can 111 and the anode 123 contacts the inner surface of the anode can 112.

The case 11 includes a gasket 113 which causes the cathode can 111 and the cathode can 112 to be fixed in an electrically insulating condition. The gasket 113 also has a function of sealing a gap between the cathode can 111 and the anode can 112 to provide air-tight and liquid-tight shielding between the inside of the case 11 and the outside.

The coin battery of the type 2032 (CR2032) is made by the following procedure. The cathode 121 was prepared by mixing a cathode active material of 52.5 mg, acetylene black of 15 mg, and PTFE of 7.5 mg, pressing at a pressure of 100 MPa to a diameter of 11 mm and a thickness of 100 μm, and drying in a vacuum dryer at 120° C. for 12 hours.

For the anode 123 of the coin battery 10 of the type 2032, lithium metal having a diameter of 13 mm and a thickness of 1 mm was used. For the non-aqueous electrolyte solution, an equal-mass mixture of ethylene carbonate (EC) and diethyl carbonate (DEC) using $LiClO_4$ of 1M as the supporting electrolyte (manufactured by Toyama Pharmaceutical Co., Ltd.) was used. In addition, a polyethylene porous membrane having a thickness of 25 μm was used for the separator 122.

The above cathode 121, separator 122, and anode 123 were used to fabricate the coin battery 10 of the type 2032 of the structure illustrated in FIG. 1 in a glove box in an argon (Ar) atmosphere with dew point controlled to −80° C.

The above coin battery 10 of the type 2032 was manufactured and left at room temperature for about 12 hours. After the open circuit voltage OCV (Open Circuit Voltage) was stabilized, it was charged at the cut-off voltage of 4.3 V with a current density of 0.4 mA/cm² relative to the cathode. After a pause of 1 hour, the discharge capacity when the cut-off voltage was discharged at 3.0 V was measured, and the initial discharge capacity was determined. The multi-channel voltage/current generator (Model: R6741A, manufactured by Advantest corporation) was used to measure the initial discharge capacity.

Figure 2B:
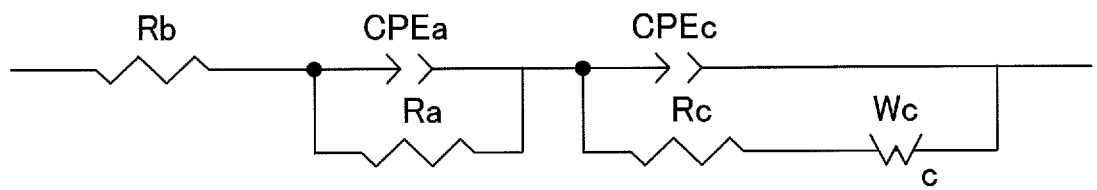
FIG. 2B schematically illustrates an equivalent circuit used to analyze the impedance evaluation.

The resistance was measured by an AC impedance method using a coin battery of the type 2032 charged at a charge potential of 4.0 V. The measurements were made using a frequency response analyzer and potentiogalvanostat (manufactured by Solatron) to obtain a Nyquist plot as illustrated in FIG. 2A. Because the plot is represented as the sum of the solution resistance, the cathode resistance and the capacitance, and the characteristic curve representing the cathode resistance and the capacitance, the fitting calculation was performed using an equivalent circuit illustrated in FIG. 2B, and the value of the cathode resistance was calculated. Because the cathode resistance varies greatly depending on the structure and parts of the cell, the cathode resistance (Q) of Example 1 and the cathode resistance of other Examples and Comparative Examples were evaluated as relative values in the evaluation of the cathode resistance of Example 1 and Comparative Examples, respectively.

Example 1

Lithium hydroxide anhydride and nickel complex oxides represented by $Ni_{0.91}Co_{0.045}Al_{0.045}O$ were weighed and mixed so that Li/Me, which is the ratio of lithium (Li) to metal other than lithium (Me) becomes 1.02.

The metal other than lithium means the metallic component included in the nickel complex oxide, that is, Ni, Co, and Al. As the nickel complex oxide, a nickel complex hydroxide manufactured by the crystallization method was used which was prepared by roasting at 500° C. under atmospheric atmosphere (oxygen: 21 vol %).

The mixture was then fired by putting the mixture into a saggar and keeping it at 765° C. for 220 minutes in an atmosphere having an oxygen concentration of 80 vol % or more using Roller Hearth Kiln, thereby forming a lithium nickel complex oxide.

To the resulting particles (powder) of the lithium metal complex oxide represented by $Li_{1.02}Ni_{0.91}Co_{0.045}Al_{0.045}O_2$, ion-exchanged water of 6.0 L was added to the lithium metal complex oxide of 7.5 kg and slurried.

The conductivity of the ion-exchanged water used was 5 μS/cm.

The slurry was stirred for 10 minutes and filtered through a filter press (water-washing process).

A mixture of tungsten was prepared by adding tungsten trioxide of 26.8 g to the obtained filtrated material so that the ratio of the number of atoms of tungsten to the number of atoms of the metallic component other than lithium contained in the lithium nickel complex oxide particles was 0.15% and mixing at the room temperature (25° C.) for 5 minutes. The shaker mixer was used for mixing.

In this example, tungsten trioxide with the characteristics illustrated in Table 1 was used as the tungsten trioxide. Tungsten trioxide was prepared by subjecting commercially available tungsten trioxide to heat treatment while stirring under a flow of oxygen, followed by a milling process using a hammer mill to obtain the characteristics illustrated in Table 1.

The resulting water content of the tungsten mixture was 4.5% by mass.

Next, the tungsten mixture was heat treated under a decarboxylated air atmosphere for 1.0 hours at 70° C. (first heat treatment process), and then the temperature was raised to 170° C. and kept for 6 hours (second heat treatment process) to obtain the cathode active material.

Table 1 indicates evaluation results of the obtained cathode active material.

Examples 2 to 5

The cathode active material was produced and evaluated in the same manner as Example 1, except that tungsten trioxide having the characteristics indicated in Table 1 was used as the tungsten trioxide. As for the tungsten trioxide, the commercially available tungsten trioxide was subjected to a heat treatment while stirring under a flow of oxygen, and then subjected to a milling process using the hammer mill to obtain the characteristics indicated in Table 1.

Example 6

Lithium hydroxide anhydride and nickel complex oxides represented by $Ni_{0.88}Co_{0.09}Al_{0.30}O$ were weighed and mixed so that Li/Me, which is the ratio of lithium (Li) to metal other than lithium (Me), was 1.02.

The metal other than lithium means a metallic component included in nickel complex oxide, that is, Ni, Co, and Al. As the nickel complex oxide, a nickel compound hydroxide manufactured by the crystallization method was used which was prepared by roasting at 500° C. under air atmosphere (Oxygen: 21 vol %).

The mixture was then fired by putting the mixture into a bowl and keeping at 765° C. for 220 minutes in an atmosphere having an oxygen concentration of 80 vol % or more using Roller Hearth Kiln, thereby forming a lithium nickel complex oxide.

To the resulting particles (powder) of lithium metal complex oxide represented by $Li_{1.02}Ni_{0.88}Co_{0.09}Al_{0.03}O_2$, ion-exchanged water of 6.0 L was added to lithium metal complex oxide of 7.5 kg and slurried.

The conductivity of the ion-exchanged water used was 5 µS/cm.

The slurry was stirred for 10 minutes and filtered through a filter press (water-washing process).

A mixture of tungsten was prepared by adding tungsten trioxide of 26.8 g to the obtained filtrated material so that the ratio of the number of atoms of tungsten to the number of atoms of the metallic component other than lithium contained in the lithium nickel complex oxide particles was 0.15% and mixing at the room temperature (25° C.) for 5 minutes. The shaker mixer was used for mixing.

In this example, tungsten trioxide with the characteristics indicated in Table 1 was used as the tungsten trioxide. Tungsten trioxide was prepared by subjecting commercially available tungsten trioxide to heat treatment while stirring under a flow of oxygen, followed by a milling process using a hammer mill to obtain the characteristics illustrated in Table 1.

The resulting water content of the tungsten mixture was 4.5% by mass.

Next, the tungsten mixture was heat treated under a decarboxylated air atmosphere for 1.0 hours at 70° C. (first heat treatment process), and then the temperature was raised to 170° C. and kept for 6 hours (second heat treatment process) to obtain cathode active material.

Table 1 indicates the evaluation results of the obtained cathode active material.

Examples 7 to 10

Cathode active material was produced and evaluated in the same manner as Example 6, except that tungsten trioxide having the characteristics indicated in Table 1 used as the tungsten trioxide. As for the tungsten trioxide, the commercially available tungsten trioxide was subjected to a heat treatment while stirring under a flow of oxygen, and then subjected to a milling process using the hammer mill to obtain the characteristics indicated in Table 1.

Comparative Examples 1 to 4

Cathode active material was produced and evaluated in the same manner as Example 1, except that tungsten trioxide having the characteristics indicated in Table 1 used as the tungsten trioxide.

In Comparative Example 2, commercially available tungsten trioxide was used as is. In Comparative Examples 1, 3, and 4, commercially available tungsten trioxide was subjected to a heat treatment while stirring under a flow of oxygen, and then subjected to a milling process using the hammer mill to obtain the characteristics indicated in Table 1.

Comparative Examples 5 to 8

Cathode active material was produced and evaluated in the same manner as Example 6, except that tungsten trioxide having the characteristics indicated in Table 1 used as the tungsten trioxide.

In Comparative Example 6, commercially available tungsten trioxide was used as is. In Comparative Examples 5, 7, and 8, the commercially available tungsten trioxide was subjected to a heat treatment while stirring under a flow of oxygen, and then subjected to a milling process using the hammer mill to obtain the characteristics indicated in Table 1.

TABLE 1

| | Tungsten trioxide | | | | | Coated particle of lithium nickel complex oxide | | Battery evaluation result | |
| | | | | | | Relative standard deviation of ratio of the number of | Ratio of the number of atoms of tungsten relative | | |
| | XRD peak intensity ratio | Particle size | | | Specific surface area $m^2/g$ | atoms of tungsten relative to the number of metallic component other than lithium | to the number of metallic component other than lithium (%) | Initial discharge capacity mAh/g | Reaction resistance ratio a.u. |
| | | D50 µm | D10 µm | D90 µm | | | | | |
| Example 1 | 0.08 | 40 | 15 | 75 | 5.8 | 0.10 | 0.15 | 216 | 100 |
| Example 2 | 0.12 | 48 | 20 | 100 | 4.8 | 0.25 | 0.15 | 213 | 105 |

TABLE 1-continued

|  | Tungsten trioxide | | | | | Coated particle of lithium nickel complex oxide | | Battery evaluation result | |
|---|---|---|---|---|---|---|---|---|---|
|  | XRD peak intensity ratio | Particle size | | | Specific surface area $m^2/g$ | Relative standard deviation of ratio of the number of atoms of tungsten relative to the number of metallic component other than lithium | Ratio of the number of atoms of tungsten relative to the number of metallic component other than lithium (%) | Initial discharge capacity mAh/g | Reaction resistance ratio a.u. |
|  |  | D50 μm | D10 μm | D90 μm |  |  |  |  |  |
| Example 3 | 0.13 | 40 | 15 | 70 | 0.9 | 0.30 | 0.15 | 211 | 100 |
| Example 4 | 0.10 | 40 | 15 | 70 | 5.5 | 0.10 | 0.07 | 215 | 102 |
| Example 5 | 0.11 | 43 | 20 | 65 | 6.5 | 0.11 | 0.80 | 205 | 110 |
| Example 6 | 0.08 | 40 | 15 | 75 | 5.8 | 0.09 | 0.15 | 208 | 98 |
| Example 7 | 0.12 | 48 | 20 | 100 | 4.8 | 0.25 | 0.15 | 204 | 102 |
| Example 8 | 0.13 | 40 | 15 | 70 | 0.9 | 0.30 | 0.16 | 200 | 99 |
| Example 9 | 0.10 | 40 | 15 | 70 | 5.5 | 0.11 | 0.07 | 205 | 100 |
| Example 10 | 0.11 | 43 | 20 | 65 | 6.5 | 0.10 | 0.85 | 203 | 105 |
| Comparative Example 1 | 0.20 | 41 | 20 | 70 | 6.8 | 0.50 | 0.15 | 198 | 180 |
| Comparative Example 2 | 1.00 | 40 | 20 | 70 | 5.0 | 0.50 | 0.15 | 195 | 200 |
| Comparative Example 3 | 0.18 | 60 | 30 | 105 | 5.5 | 0.45 | 0.18 | 190 | 190 |
| Comparative Example 4 | 0.25 | 20 | 8 | 55 | 5.2 | 0.43 | 0.17 | 198 | 180 |
| Comparative Example 5 | 0.20 | 41 | 20 | 70 | 6.8 | 0.50 | 0.17 | 180 | 185 |
| Comparative Example 6 | 1.00 | 40 | 20 | 70 | 5.0 | 0.50 | 0.15 | 182 | 200 |
| Comparative Example 7 | 0.18 | 60 | 30 | 105 | 5.5 | 0.45 | 0.16 | 179 | 185 |
| Comparative Example 8 | 0.25 | 20 | 8 | 55 | 5.2 | 0.43 | 0.15 | 180 | 190 |

According to the results illustrated in Table 1, it was confirmed that the relative standard deviation of the ratio of the number of atoms of tungsten to the number of atoms of the metallic component other than lithium contained in the coated lithium nickel complex oxide particles of the cathode active material was reduced for the cathode active material obtained in Examples 1 to 10.

In other words, it was confirmed that the coated lithium nickel complex oxide particles, which had been contained in the cathode active material, contained the compounds of tungsten and lithium approximately evenly. Said differently, the lithium nickel complex oxide particles were coated particles.

In addition, in the non-aqueous electrolyte secondary battery (lithium ion secondary battery) using the cathode active material obtained in Examples 1 to 10, the initial discharge capacity was higher than that in Comparative Examples 1 to 8, and it was confirmed that the reaction resistance was suppressed. From these results, it was confirmed that the battery characteristics can be stably enhanced in the non-aqueous electrolyte secondary battery using the cathode active material of Examples 1 to 10.

As described above, the active cathode material for the non-aqueous electrolyte secondary battery and the method of manufacturing the active cathode material for the non-aqueous electrolyte secondary battery have been described in the embodiments and the Examples, but the present invention is not limited to the above-described embodiments and the Examples. Various modifications and variations are possible within the scope of the points of the invention as recited in the claims.

This application claims the priority of the Patent Application No. 2017-224023 filed with the Japan Patent Office on Nov. 21, 2017, and the entire contents of the Patent Application No. 2017-224023 are incorporated herein by reference.

The invention claimed is:

1. A method of manufacturing a cathode active material for a non-aqueous electrolyte secondary battery, the method comprising:
    a mixing process of mixing lithium nickel complex oxide particles, tungsten trioxide, and water to obtain tungsten mixture, the lithium nickel complex oxide particles including primary particles of a lithium nickel complex oxide represented by a general formula: $Li_zNi_{1-x-y}Co_xM_yO_{2+\alpha}$ (where $0<x\leq0.35$, $0\leq y\leq0.35$, $0.95\leq z\leq1.20$, $-0.2<\alpha\leq-0.2$, and M is at least one element selected from Mn, V, Mg, Mo, Nb, Ti, and Al), and secondary particles in which the primary particles aggregate; and
    a heat treatment process of heat-treating the tungsten mixture,
    wherein a heat treatment temperature throughout the heat treatment process is 200° C. or lower,
    wherein the tungsten trioxide has a ratio of $I_{WO2.90}/I_{WO3.00}$ equal to or lower than 0.15, where $I_{WO2.90}$ is a peak intensity of a (200) plane of $WO_{2.90}$ and $I_{WO3.00}$ is a peak intensity of a (200) plane of $WO_{3.00}$ in an XRD pattern, and
    wherein a specific surface area of tungsten trioxide is 0.5 $m^2/g$ or more and 7.0 $m^2/g$ or less.

2. The method of manufacturing the cathode active material for the non-aqueous electrolyte secondary battery according to claim 1,
    wherein a cumulative 10% particle diameter of the tungsten trioxide is 10 μm or more, a cumulative 50% particle diameter of the tungsten trioxide is 30 μm or more and 55 μm or less, and a cumulative 90% particle diameter of the tungsten trioxide is 100 μm or less.

3. A cathode active material for a non-aqueous electrolyte secondary battery made by the method according to claim 1, wherein the cathode active material comprises:
primary particles of a lithium nickel complex oxide represented by a general formula: $Li_zNi_{1-x-y}Co_xM_yO_{2+\alpha}$ (where $0<x\leq0.35$, $0\leq y\leq0.35$, $0.95\leq z\leq1.20$, $-0.2<\alpha\leq-0.2$, and M is at least one element selected from Mn, V, Mg, Mo, Nb, Ti, and Al);
secondary particles in which the primary particles aggregate,
wherein a plurality of coated lithium nickel complex oxide particles are formed by disposing a compound containing tungsten and lithium on surfaces of the secondary particles and surfaces of the inside primary particles,
wherein the compound containing tungsten and lithium is selected from $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_{18}W_5O_{15}$, or any of hydrates thereof, and
wherein a relative standard deviation of a ratio of a number of atoms of tungsten to a number of atoms of a metallic component other than lithium contained in the coated lithium nickel complex oxide particles is 0.4 or lower.

4. The cathode active material for the non-aqueous electrolyte secondary battery according to claim 3,
wherein the ratio of the number of atoms of tungsten to the number of atoms of the metallic component other than lithium in the coated lithium nickel complex oxide particles is 0.01% or higher and 3.0% or lower.

* * * * *